(No Model.)
J. PITKIN.
SECONDARY BATTERY OR ACCUMULATOR.
No. 341,600. Patented May 11, 1886.
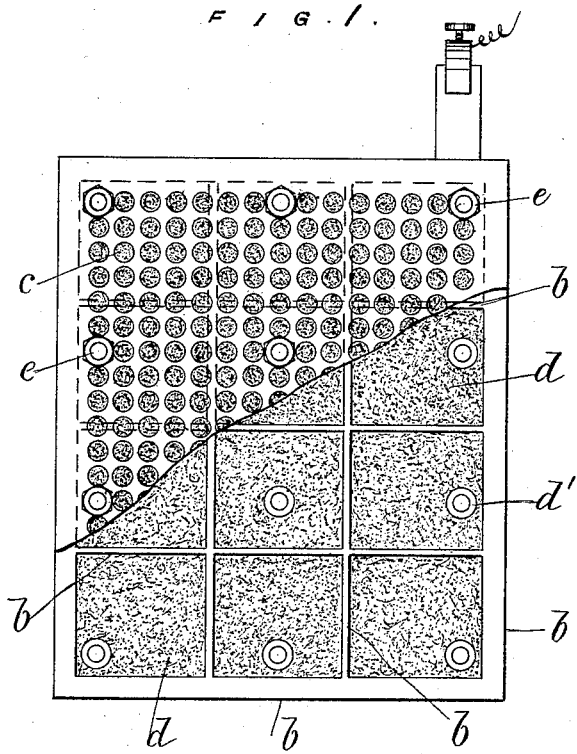
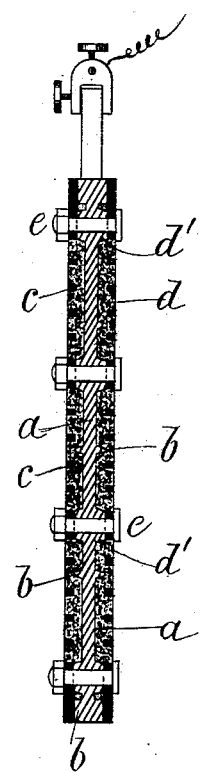
Witnesses:
C. Sedgwick
Edgar Tate
Inventor:
J. Pitkin
By Munn & Co
Attorneys.

UNITED STATES PATENT OFFICE.

JAMES PITKIN, OF CLERKENWELL, COUNTY OF MIDDLESEX, ENGLAND.

SECONDARY BATTERY OR ACCUMULATOR.

SPECIFICATION forming part of Letters Patent No. 341,600, dated May 11, 1886.

Application filed January 30, 1886. Serial No. 190,332. (No model.) Patented in England March 12, 1885, No. 3,260.

*To all whom it may concern:*

Be it known that I, JAMES PITKIN, of 56 Red Lion Street, Clerkenwell, in the county of Middlesex, England, scientific instrument-maker, have invented new and useful Improvements in Secondary Batteries or Accumulators, of which the following is a full, clear, and exact description.

My invention relates to improvements in the manufacture of elements for secondary batteries or accumulators; and it has for its object to prevent the active material from becoming detached from the plate or support and to avoid liability of short-circuiting.

According to my invention the element is constructed of a central plate or support of metallic lead, against which the spongy lead or peroxide of this metal is held by perforated plates of ebonite, the lead plate having ribs cast on its faces which divide up the faces of the plate into cells, into which the active material is packed.

Reference is to be had to the accompanying drawings, forming part of this specification, wherein Figure 1 is a face view of an element, part of the perforated non-conducting inclosing-plate being broken away. Fig. 2 is a vertical section through same.

The same letters of reference indicate the same parts in both figures.

$a$ is the central supporting-plate of metallic lead having cast on both of its faces marginal and intermediate cross-ribs, $b\ b$, forming distance-pieces for the perforated inclosing-plates $c\ c$, of ebonite or other suitable non-conducting material, to abut against.

$d$ is the active material, packed into the spaces bounded by the ribs $b$. The marginal ribs prevent the active material escaping at the edges of the element. The intermediate ribs divide up the surface of the plate and act as distance-pieces to determine the thickness of the layer of active material, and by facilitating the escape of gas prevent the adhesion of the active material to the plate becoming impaired. The ribs need not be continuous, but may be interrupted at intervals if preferred. The ribs, instead of being formed on the lead plate, may be formed on the non-conducting perforated inclosing-plates $c$, or may be separate pieces. The perforated plates $c$ are clamped against the ribs $b$, and the whole united by bolts $e$, of ebonite, passing through holes in the plates $c$ and through holes in bosses $d'$, cast on the plate $a$, the bolts being secured by ebonite nuts. By this construction I obtain an even layer or layers of active material upon the whole surface of the support and prevent waste of current in charging. The elements are held in place in the cell by resting on blocks, of porcelain or other equivalent material, having V or other shaped depressions for the elements to rest in.

Having now particularly described and ascertained the nature of the said invention and in what manner the same is to be performed, I declare that what I claim is—

1. In the construction of the elements of a voltaic battery, the combination, with a conductive plate having marginal and intermediate ribs cast on its faces, of perforated plates of non-conducting material united thereto by bolts of non-conducting material, the perforated plates inclosing the faces of the conducting-plate and holding the active material in contact therewith, substantially as described, and shown in the drawings.

2. In an element for a voltaic battery, the combination of a central conductive plate, perforated non-conducting inclosing-plates bolted to the opposite faces of the central plate by bolts of non-conducting material, and intermediate distance pieces or ribs to determine the thickness of the layer of active material and hold it in place, substantially as specified.

The foregoing specification of my improvements in secondary batteries or accumulators signed by me this 9th day of January, 1886.

JAMES PITKIN.

Witnesses:
   JNO. DEAN,
   HERBERT E. DALE,
     *Both of 17 Gracechurch St., London.*